United States Patent [19]

Haendle et al.

[11] Patent Number: 5,371,776
[45] Date of Patent: Dec. 6, 1994

[54] RADIOLOGICAL INSTALLATION

[75] Inventors: Joerg Haendle; Heinz Horbaschek, both of Erlangen, Germany

[73] Assignee: Siemens Aktiengesellschaft, Munich, Germany

[21] Appl. No.: 132,799

[22] Filed: Oct. 7, 1993

[30] Foreign Application Priority Data

Oct. 19, 1992 [DE] Germany .................. 4235172

[51] Int. Cl.$^5$ .................................... H05G 1/64
[52] U.S. Cl. .................... 378/98.12; 378/98.2
[58] Field of Search ............. 378/98, 98.2, 98.11, 378/98.12, 98.6

[56] References Cited

U.S. PATENT DOCUMENTS

| | | | |
|---|---|---|---|
| 4,613,983 | 9/1986 | Yedid et al. | 378/99 |
| 4,710,821 | 12/1987 | Ohta | 358/256 |
| 4,825,365 | 4/1989 | Inoue | 364/413.19 |
| 5,123,056 | 6/1992 | Wilson | 382/6 |
| 5,138,460 | 8/1992 | Egawa | 358/224 |

FOREIGN PATENT DOCUMENTS

| | | | |
|---|---|---|---|
| 0294622A2 | 12/1988 | European Pat. Off. | H04N 1/393 |
| 3919473C1 | 12/1990 | Germany | G03B 42/02 |
| 4102729A1 | 8/1991 | Germany | A61B 6/00 |

Primary Examiner—David P. Porta
Attorney, Agent, or Firm—Hill, Steadman & Simpson

[57] ABSTRACT

In a radiological installation comprising an image pick-up system having a memory for individual images and having an image playback unit, an overall image formed of at least two individual images is capable of being portrayed, the number of lines thereof being at least largely independent of the sum of the number of lines of the individual images. For that purpose, the overall image is compiled line-by-line with a processor controller such that respectively one row of stored picture elements of an individual image forms a section of one line of the overall image, and a corresponding row of stored picture elements of at least one further individual image respectively adjoins this section.

10 Claims, 5 Drawing Sheets

RADIOLOGICAL INSTALLATION

BACKGROUND OF THE INVENTION

The present invention is directed to a radiological installation comprising an image pick-up system for producing and storing high-resolution, digital individual images from coherent individual examination regions as picture elements in a store, as well as an electronic image playback unit with which a plurality of picture elements from at least two stored individual images can be simultaneously reproduced as an overall image.

DE-41 02 729 A1, corresponding to U.S. Pat. No. 5,123,056, discloses a radiological installation of the type discussed above. The overall image is composed in image-wise fashion of individual images with an image processing and control unit such that a last line of a first individual image adjoins a first line of a second individual image, potentially with omission of lines of the images falling into an overlap region of the examination region. As a result thereof, the number of lines required for the overall image approximately corresponds to the sum of lines from the joined images when no image diminution that reduces the resolution is undertaken.

SUMMARY OF THE INVENTION

In a radiological installation of the type discussed above, an object of the invention is to present a high-resolution overall image composed of at least two individual images, whereby the number of lines of the overall image is at least largely independent of the sum of the line numbers of the individual images.

According to the invention, a radiological installation is provided having an image pick-up system for producing and storing high-resolution, digital individual images of coherent individual examination regions as picture elements in a memory. An electrical image playback unit is provided with which a plurality of picture elements from at least two stored individual images can be simultaneously reproduced as an overall image. A processor controller is connected to the memory. The processor controller imposes the overall image line-by-line such that respectively one row of stored picture elements of a first of the two individual images forms a section of respectively one line of the overall image and a corresponding row of picture elements of the second individual image respectively adjoins said section.

A critical advantage of the radiological installation of the invention is that the high-resolution overall image composed of at least two individual images comprises a line number that is at least largely independent of the sum of the images. This is achieved by a line-by-line compilation of the overall image with a processor controller, whereby respectively one first row of stored picture elements of an image forms a section of respectively one line of the overall image and a corresponding row of stored picture elements of at least one further image respectively adjoins this section.

Further advantages and details of the invention derive from the following description of exemplary embodiments with reference to the drawings and in combination with the claims.

DESCRIPTION OF THE PREFERRED EMBODIMENTS

Figure 1:
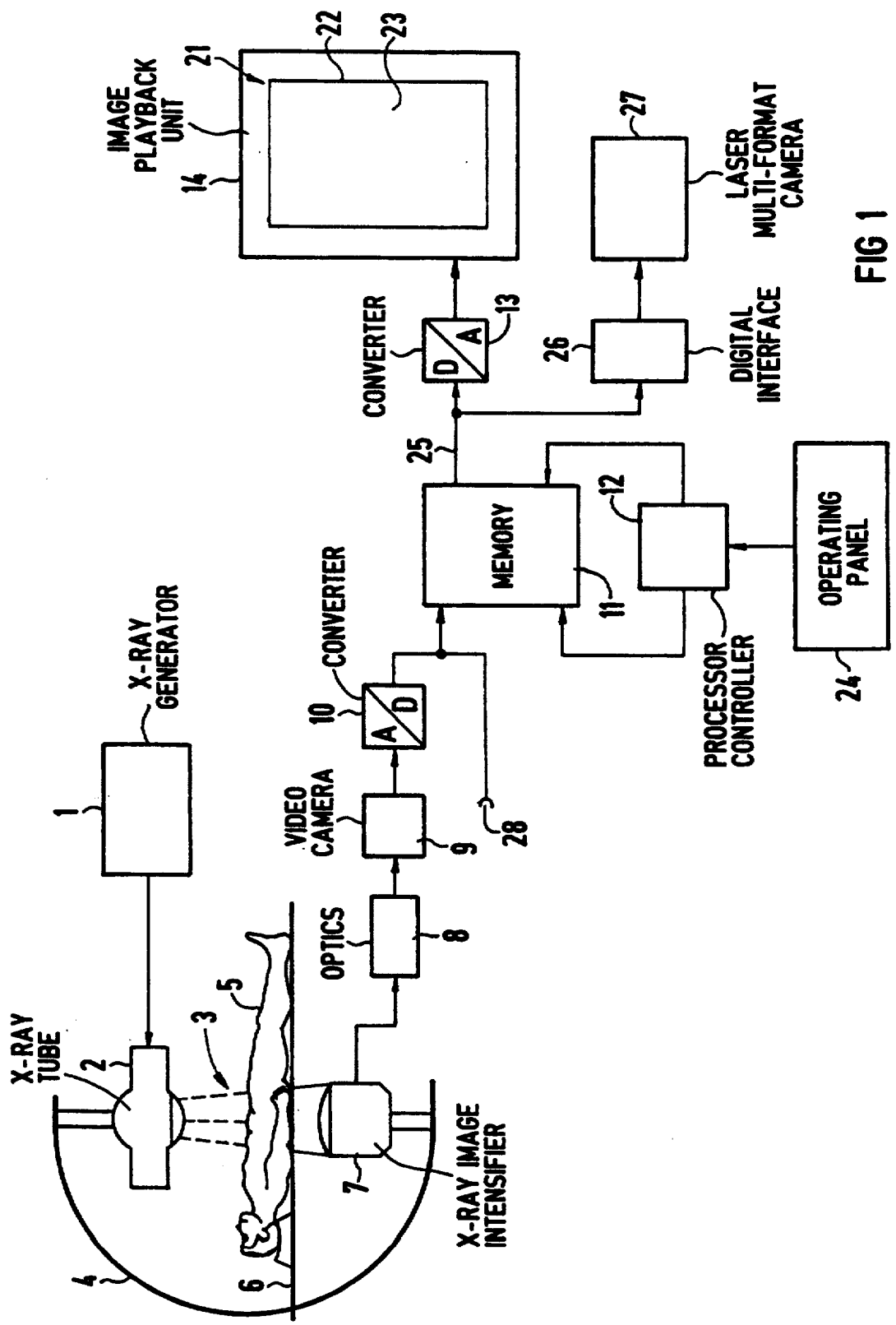
FIG. 1 is a radiological installation of the invention.

FIG. 1 shows a radiological installation comprising an x-ray generator 1 that controls an x-ray tube 2 to provide x-rays 3. The x-ray tube 2 is secured to a frame arrangement 4. A subject to be examined, for example a patient 5, lies on an x-ray table 6 in a position wherein the generated x-rays 3 pass through the patient 5 and impinge an x-ray image intensifier 7 that is secured to the frame arrangement 4 at a side of the patient table 6 lying opposite the x-ray tube 2. The x-ray image intensifier 7 generates optical output signals that are supplied to a video camera 9 with an optics 8 comprising a lens system, as a result whereof a high-resolution image pick-up system is formed.

The x-ray table 6 together with the patient 5 lying thereon is movable relative to the frame arrangement 4 such that individual x-ray images can be produced from coherent, individual examination regions. These individual examination regions extend over the lower body parts of the patient 5, particularly for complete vessel portrayals of the abdomen and of the entire leg.

The video camera 9 supplies electrical output signals of each individual image from the coherent individual examination regions as picture elements. The electrical picture elements (image information signals) are supplied via an analog-to-digital converter 10 to a memory 11, for example a RAM having, for example, 1,000×5,000 memory locations, and are stored as digital picture elements (pixels). A digital image pick-up system can be connected to the memory 11 via an input terminal 28.

The high-resolution digital x-ray frames stored in the memory 11 can be read out from the memory 11 with a processor controller 12 and can be supplied via a digital-to-analog converter 13 to an electrical image playback unit 14, whereby at least two stored frames can be simultaneously reproduced as an overall image.

Figure 4:
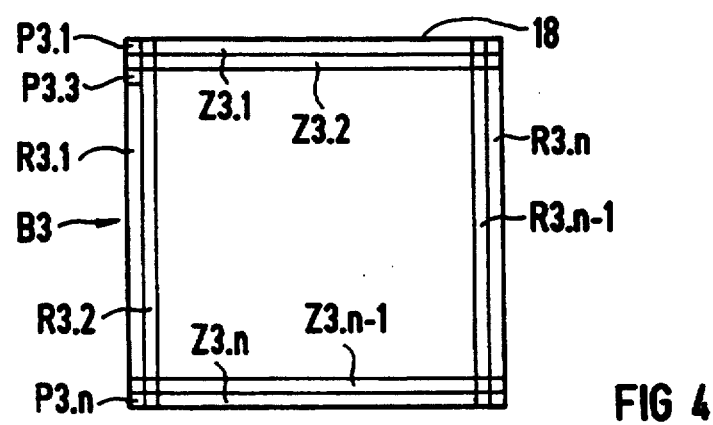
Figure 5:
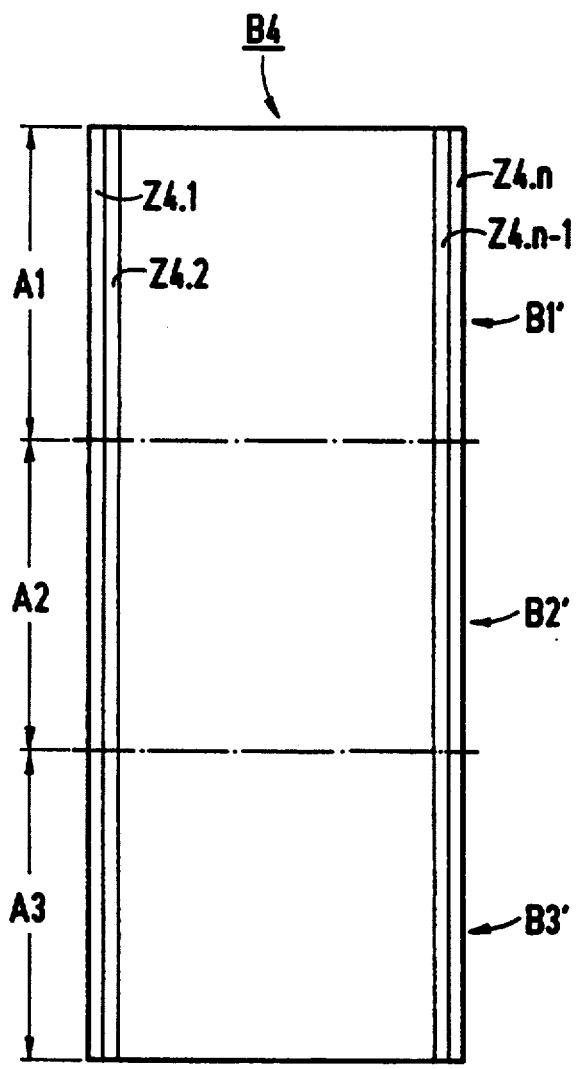

A specific method in accordance with which the processor controller 12 generates the overall image B4 shall be set forth below with reference to FIGS. 2 through 4 that show individual x-ray images B1 through B3 with their basic image format, and with reference to FIG. 5 that shows the basic image format of an overall image B4.

The individual image B1 was written into the memory 11 with horizontally proceeding lines Z1.1 through Z1.n; the individual image B2 was written into the memory 11 with horizontally proceeding lines Z2.1 through Z2.n; and the individual image B3 was likewise written into the memory 11 with horizontally proceeding lines Z3.1 through Z3.n. The coherent individual examination regions (not shown) at the patient 5 (FIG. 1) thereby extend perpendicularly relative to the horizontal line direction of the lines Z1.1 through Z3.n in the individual images B1 through B3. Each individual image B1 through B3 comprises pixels, for example P1.1 through P3.1. All pixels are allocated to the lines Z1.1 through Z3.n in a horizontal direction (line direction of the individual images B1 through B3). In a read-out direction (perpendicular to the read-in direction) turned by 90° relative to the line direction (read-in direction), the pixels form rows R1.1 through R1.n in the individual image B1, rows R2.1 through R2.n in the individual image B2 and rows R3.1 through R3.n in the individual image B3.

The overall image B4 comprises sections A1 through A3 which, after the omission of image regions that may potentially overlap, correspond to respectively remaining portions B1' through B3' of the individual images B1 through B3. For producing the overall image B4, the processor controller 12 (FIG. 1) first offers a section A1 of the new image line Z4.1 of the overall image B4 from the perpendicular pixel row R1.1 of the first individual image B1. The processor controller then skips to the individual image B2 and offers a section A2 of the new image line Z4.1 of the overall image B4 from the corresponding, vertical pixel row R2.1. The processor controller 12, for example, also attaches the further section A3 of the new image line Z4.1 of the total image B4 to this section A2, whereby this section A3 was formed from the pixel row R3.1 of the individual image B4. The first new image line Z4.1 of the overall image B5 is thus completely produced. For generating the further image lines Z4.2 through Z4.n of the overall image B4, the processor controller 12 compiles the individual pixel rows R1.2 through R3.n of the individual images B1 through B3 in accordance with the way set forth above, this being achieved by appropriate addressing.

Figure 2:
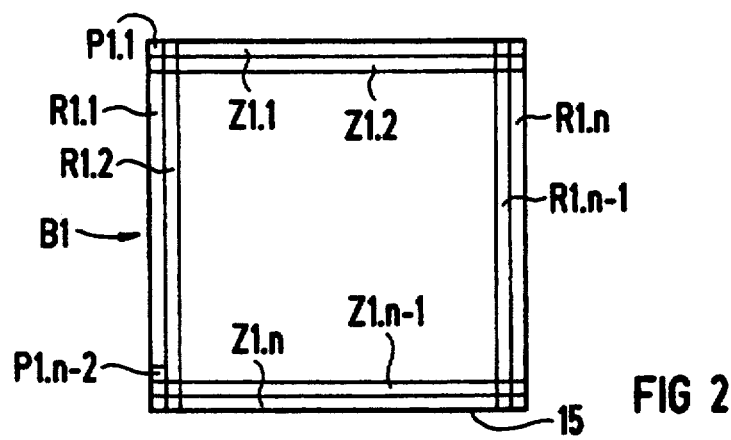
FIGS. 2 through 8 are illustrations for explaining the functioning of the system of FIG. 1.
Figure 3:
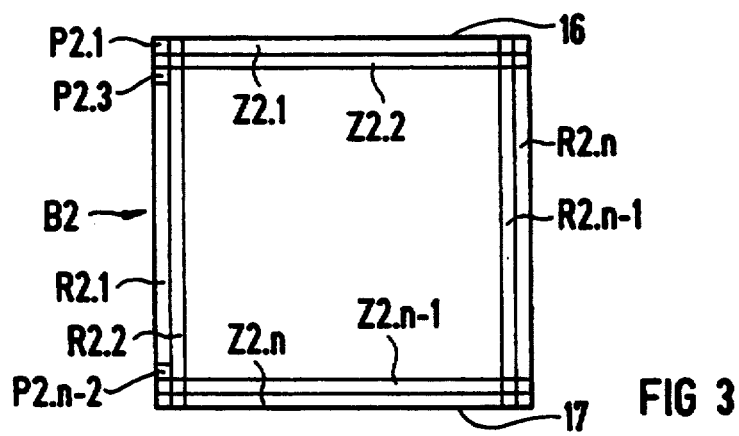

The individual image B1 in FIG. 2 comprises a lower, horizontal image edge 15 and the individual image B2 in FIG. 3 comprises an upper, horizontal image edge 16. For example, the penultimate line Z1.n-1 and the last line Z1.n in the image B1 can correspond with respect to the image content (informational content) to the first line Z2.1 and to the second line Z2.2 in the individual image B2. In a development of the invention, it is advantageous for saving memory locations in the memory 12 when the aforementioned lines representing an overlap region of the individual images B1 and B2 and proceeding parallel to the image edges 15 and 16 from one of the images B1 or B2 are not stored as a consequence of having been omitted.

Upon read-out of the pixel row R1.1, for example, one begins with the pixel P1.1 and ends with a pixel P1.n. Upon read-out of the pixel row R2.1, one thus begins with a pixel P2.3. When the two respectively closest lines that proceed parallel thereto in the individual image B2 at a lower image edge 17 and in the individual image B3 at an upper image edge 18 likewise relate to overlap regions at the images B2 and B3, these lines are also omitted from an image B2 or B3 during write-in in accordance with the above description.

Consequently, the pixel row R2.1 during read-out ends, for example, with a pixel P2.n. Upon read-out of the first image row R3.1 from the individual image B1, one then begins with the pixel B3.3 and ends with the pixel B3.n.

An alternative method in accordance with which the processor controller 12 generates the overall image B7 shall be set forth below with reference to FIGS. 6 and 7, which show the individual x-ray images B5 and B6 having an alternative, basic image format, and with reference to FIG. 8, which shows the basic image format of an overall image B7.

The individual images B5 and B6 were respectively written into the memory 11 with vertically proceeding lines. The individual lines of, for example, the video camera 9 are thus identical to the pixel rows R5.1 through R5.n in the image 5 and R6.1 through R6.n in the image B6. The coherent, individual examination regions (not shown) at the patient 5 thus again extend perpendicularly in the individual images B5 and B6, i.e. in the direction of the pixel rows or lines that likewise proceed perpendicularly. The prescribed read-in direction in the memory 11 (FIG. 1) consequently proceeds perpendicularly in the images B5 and B6. What is critical is that the read-out direction in this method as well as in the method set forth above, and thus the formation of the new rows of the respective overall image B4 or B7 proceeds in the direction of the coherent individual examination regions.

The overall image B7 comprises sections A1' and A2' that, after the omission of pixel rows that potentially overlap, respectively correspond to remaining excerpts B5' and B6' from the individual images B5 and B6. For producing the overall image B7, the processor controller 12 (FIG. 1) first offers a section A1' of a new image line Z7.1 of the overall image B7 from the vertical pixel row R5.1 of the first individual image B5. The processor controller then skips to the individual image B2 and offers a section A2' of the new image line Z7.1 of the overall image B7 from the corresponding, perpendicularly proceeding pixel row R6.1. The first new image line Z7.1 of the overall image B7 is thus completely produced. For generating the further image lines Z7.2 through Z7.n of the overall image B7, the processor controller 12 compiles the perpendicular pixel rows R5.2 through R6.n of the individual images B5 and B6 in accordance with the above-described method, this being achieved by appropriate addressing.

Figure 6:
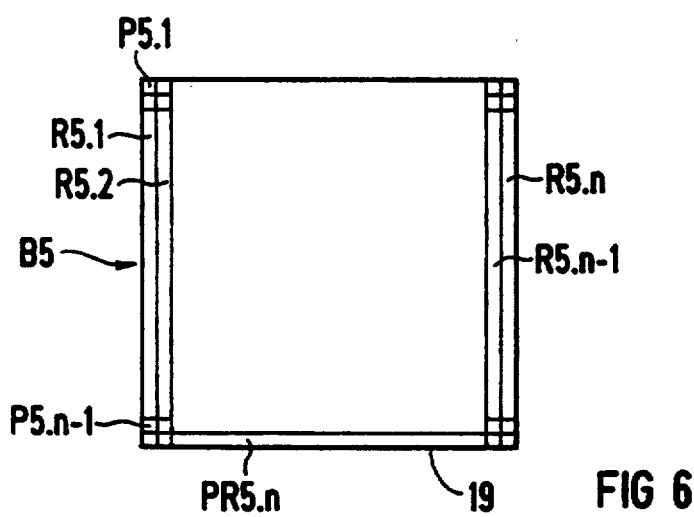
Figure 7:
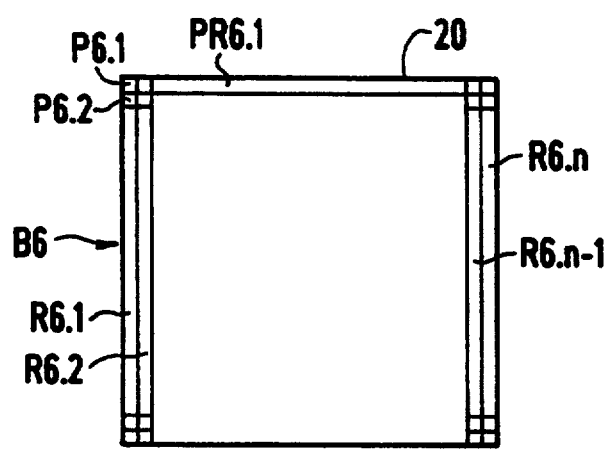
Figure 8:
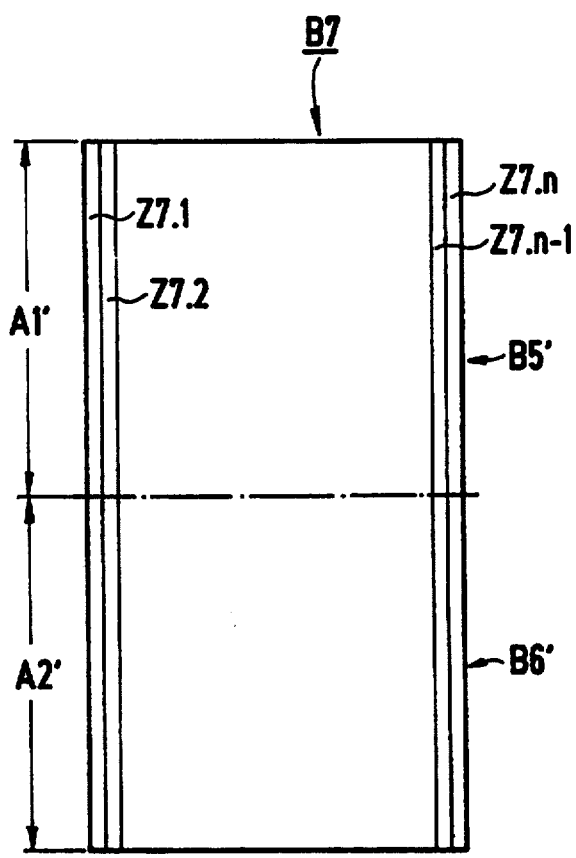

The individual image B5 in FIG. 6 comprises a lower, horizontal image edge 19 and the individual image B6 in FIG. 7 comprises an upper, horizontal image edge 20. For example, a picture element row (pixel row) PR5.n in the image B5 that proceeds parallel to this image edge 19 and proceeds turned by 90° relative to the read-in direction and a first picture element row PR6.1 in the individual image B6 can correspond to one another with respect to the image content. It is advantageous in an alternative design of the invention for saving memory locations, for example in the memory 11 (FIG. 1), when the afore-mentioned, horizontal picture element rows which represent an overlap region of the individual images B5 and B6 from one of the images B5 or B6 are not stored by omitting them.

Upon read-out of the picture element row R5.1, for example, one then begins with the picture element P5.1 but already stops with the picture element P5.n-1 when the horizontal pixel row PR5.n was omitted. Upon read-out of the picture element row R6.1, one then begins with the picture element P6.1. When, by contrast, the horizontal row PR5.n in the image B5 was not omitted and the row PR6.1 in the image B6 was omitted instead, the read-out of the vertical row R6.1 begins with the picture element P6.2.

In a development of the invention, the electronic image playback unit 14 in FIG. 1 has a playback format whose greatest expanse 22 is vertically arranged and corresponds to the direction of the lines of the overall image B4 or B7. The electrical image playback unit 14 preferably comprises a HDTV monitor tube (HDTV equals High Definition Television) or a 16:9 monitor tube or the like.

In FIG. 1, the processor controller 12 is controlled via an operating panel or work station 24 which can also contain a work station having a corresponding operating surface. In a development of the invention, conventional images can be mixed with the overall images B4 or B7 with such a work station 24.

Further, the radiological installation of FIG. 1 can comprise a laser multiformat camera 27 connectable to an output 25 of the memory 11 for the overall image B4 or B7 via a digital interface 26.

Although various minor changes and modifications might be proposed by those skilled in the art, it will be understood that we wish to include within the scope of the patent warranted hereon all such changes and modifications as reasonably come within our contribution to the art.

We claim as our invention:

1. A radiological installation, comprising:
   an image pick-up system for producing and storing at least first and second high-resolution, digital individual images of coherent individual examination regions as picture elements in a memory;
   an electrical image playback unit with which a plurality of picture elements from at least said two stored individual images can be simultaneously reproduced as an overall image; and
   a processor controller connected to said memory for composing said overall image line-by-line such that respectively one row of stored picture elements of said first individual image forms a section of respectively one line of said overall image and a corresponding row of stored picture elements of said second individual image respectively adjoins said section of said one line.

2. An installation according to claim 1 wherein said electronic image playback unit has a playback format whose greatest expanse is vertically arranged and corresponds to a direction of the lines of the overall image.

3. An installation according to claim 1 wherein said electrical image playback unit has an HDTV monitor tube.

4. An installation according to claim 1 wherein said processor controller reads said picture elements of said first and second individual images into said memory in a prescribed read-in direction which is a line direction of said first and second individual images, and picture elements respectively forming one row are read out with said processor controller in a read-out direction, which is a line direction of said overall image, that is rotated by 90° relative to a direction of the read-in.

5. An installation according to claim 4 wherein said processor controller, upon read-in of said first and second images into said memory, not storing by omission at least one line that proceeds parallel to a picture edge of a respective first or second individual image and that falls into an overlap region of the individual examination regions at at least one image edge of the respective individual first or second images.

6. An installation according to claim 1 wherein said processor controller reads said picture elements of said first and second individual images into the memory in a prescribed read-in direction, which is a line direction of the first and second individual images, and said processor controller reads out the picture elements respectively forming one row in a read-out direction, which is a line direction of the overall image, which corresponds to the read-in direction.

7. An installation according to claim 6 wherein said processor controller, upon read-in of said first and second individual images into said memory, does not store by omission at least one row of picture elements that falls into an overlap region of the individual examination regions and that is turned by 90° relative to said read-in direction, which is the line direction of the first and second individual images, and that proceeds parallel to an image edge of the respective first or second individual image at at least one image edge of the respective first or second individual image.

8. An installation according to claim 1 wherein a work station having a corresponding operating surface is provided for mixing in conventional images to the overall image.

9. An installation according to claim 1 wherein a laser multiformat camera is connected via a digital interface to an output of said memory for said overall image.

10. A radiological installation, comprising:
    an image pick-up system for producing and storing at least first and second digital individual images of adjacent individual examination regions as picture elements in a memory;
    an electrical image playback unit with which a plurality of picture elements from at least said two stored individual images can be reproduced as an overall image; and
    a processor controller connected to said memory for composing said overall image line-by-line such that a respective row of stored picture elements of said first individual image forms a first section of a respective line of said overall image and a corresponding respective row of stored picture elements of said second individual image forms a second section adjoining said first section of said respective line.

* * * * *